United States Patent
Dahlgren et al.

(10) Patent No.: US 12,505,447 B2
(45) Date of Patent: Dec. 23, 2025

(54) METHOD AND SYSTEM FOR VALIDATING FINANCIAL EVENTS AND SECURITY EVENTS

(71) Applicant: REFINE INTELLIGENCE LTD., Kidron (IL)

(72) Inventors: Zachary Richard Dahlgren, Gretna, NE (US); Uri Rivner, Kidron (IL); Oren Kedem, Tel Aviv (IL)

(73) Assignee: Refine Intelligence Ltd., Kidron (IL)

( * ) Notice: Subject to any disclaimer, the term of this patent is extended or adjusted under 35 U.S.C. 154(b) by 353 days.

(21) Appl. No.: 17/872,045

(22) Filed: Jul. 25, 2022

(65) Prior Publication Data

US 2023/0032963 A1     Feb. 2, 2023

Related U.S. Application Data

(60) Provisional application No. 63/225,842, filed on Jul. 26, 2021.

(51) Int. Cl.
    *G06Q 40/00*        (2023.01)
    *G06Q 20/40*        (2012.01)
    *G06N 20/00*        (2019.01)

(52) U.S. Cl.
    CPC ......... *G06Q 20/4016* (2013.01); *G06N 20/00* (2019.01)

(58) Field of Classification Search
    CPC ........................... G06Q 20/4016; G06N 20/00
    See application file for complete search history.

(56) References Cited

U.S. PATENT DOCUMENTS

| | | | | |
|---|---|---|---|---|
| 11,019,090 | B1* | 5/2021 | Smith | H04L 63/1425 |
| 11,706,337 | B1* | 7/2023 | Mitchem | G06F 40/30 |
| | | | | 704/270.1 |
| 11,775,979 | B1* | 10/2023 | Burger | G06Q 10/0635 |
| | | | | 705/44 |
| 2006/0282660 | A1* | 12/2006 | Varghese | G07F 7/1083 |
| | | | | 713/155 |
| 2010/0114776 | A1* | 5/2010 | Weller | G06Q 20/4016 |
| | | | | 705/325 |
| 2012/0109821 | A1* | 5/2012 | Barbour | G06Q 40/02 |
| | | | | 705/44 |
| 2020/0034842 | A1* | 1/2020 | Ponniah | G06Q 40/03 |

(Continued)

FOREIGN PATENT DOCUMENTS

| | | | | |
|---|---|---|---|---|
| CN | 114285942 | * | 1/2025 | G06Q 20/42 |
| WO | WO-2006118968 A2 | * | 11/2006 | H04L 63/105 |

OTHER PUBLICATIONS

Guraieb, "Does There Have to Be a Tradeoff Between Fraud Prevention and Customer Experience," Live Webinar, Is Your Onboarding Process Truly Future-Proof, 2021 (Year: 2021).*

(Continued)

*Primary Examiner* — Abhishek Vyas
*Assistant Examiner* — William B. Bunker
(74) *Attorney, Agent, or Firm* — Meitar Patents Ltd.; Daniel Kligler

(57) ABSTRACT

Methods and systems provide for approaching end-users, collecting their information as it relates to a specific suspect event or set of events, for security events, such as financial events and computer security events, and then applying an Artificial Intelligence (AI) model, to a given security event, to analyze the provided information, to investigate the event or set of events, for validation.

18 Claims, 6 Drawing Sheets

(56) References Cited

U.S. PATENT DOCUMENTS

| | | | |
|---|---|---|---|
| 2020/0065809 A1* | 2/2020 | Elfeky | G06Q 20/355 |
| 2021/0073371 A1* | 3/2021 | Semichev | G06Q 20/4097 |
| 2021/0103838 A1* | 4/2021 | Yuan | G06F 18/23 |
| 2021/0312035 A1* | 10/2021 | Semichev | G06F 21/52 |
| 2023/0325852 A1* | 10/2023 | Ma | G06Q 30/018 |
| | | | 705/7.29 |
| 2024/0135383 A1* | 4/2024 | Dutt | G06Q 20/4016 |
| 2024/0265405 A1* | 8/2024 | Kramme | G06Q 20/24 |

OTHER PUBLICATIONS

Tertychnyi et al., Detecting Group Behavior for Anti-Money Laundering With Incomplete Network Information, IEEE International Conference on big Data, 2022 (Year: 2022).*

Thisarani et al., "Artificial Intelligence for Futuristic Banking," IEEE International Conference on Engineering Technology and Innovation, 2021 (Year: 2021).*

* cited by examiner

FIG. 2A

| Questionnaire | Question 202 | Answer 203 | 3rd Party 204 | User Feature 205 |
|---|---|---|---|---|
| Real Estate Purchase | Real estate address | Country/State/County/City/Street/Zip Code | | |
| Real Estate Purchase | Have you been to the real estate | yes/no | | UserVisitedRealEstate |
| Real Estate Purchase | Purchase price? | Number | Purchase Prices for the type of real estate in the same area | UserPurchasePrice-70Percentile |
| | | | | UserPurchasePrice-90Percentile |
| | | | | UserPurchasePrice-98Percentile |
| Real Estate Purchase | IdentfyRealEstateInGoogleStreet | yes/no | GoogleStreet | UserIdentifiedRealEstestateImage |
| Real Estate Purchase | Where do you live (permanent residence) | User residence Country/State/County/City/Street/Zip Code | Distance from purchased Real Estate and | PuschaseNear (10miles Radius) |
| | | | | PurchaseSameCity |
| | | | | PurchaseSameCounty |
| | | | | PurchaseSameState |
| | | | | PuchaseSameCountry |
| Real Estate Purchase | Purchase Reason | Investment, Plan to move there yourself, For a close family member (e.g. Children), Other | | InvestmentPurchase |
| | | | | MovePurchase |
| | | | | FamilyPurchase |
| | | | | OtherPurchase |

201 → (points to table)
210 { (brace around rows)

(AAA)

METHOD AND SYSTEM FOR VALIDATING FINANCIAL EVENTS AND SECURITY EVENTS

CROSS REFERENCES TO RELATED APPLICATIONS

This application is related to and claims priority from commonly owned U.S. Provisional Patent Application Ser. No. 63/225,842, entitled: System For Automatically Collecting And Validating User Explanations For High-Risk Financial And Security Events, filed on Jul. 26, 2021, the disclosure of which is incorporated by reference in its entirety herein.

TECHNICAL FIELD

The present disclosed subject matter identifies and analyzes financial and security events and determines whether to stop the event or let the event proceed.

BACKGROUND OF THE DISCLOSURE

Financial institutions such as banks typically have large compliance departments to manually examine financial transactions of funds passing through their banks. Typically, a transaction is reviewed manually, based on back end logs. Should the transaction exhibit certain criteria, an alert is issued, which typically results in an investigation being conducted. Such an investigation takes time, and typically proceeds without the customer being contacted, so as not to cause additional customer activity, and/or create anxiety with the customer, such that the customer feels insulted, and may leave the bank. Additionally, by the investigation taking time to complete, the customer's account may be subject to limited use or simply frozen, creating a strain on the customer's personal life and/or business.

However, due to the sheer number of transactions, coupled with the amount of time needed for an investigation, many potentially fraudulent or illegal transactions, such as money laundering, go undetected. On the other hand, many transactions which appear to be fraudulent, are genuine, whereby the present system of manual investigations has a high rate of false positives, e.g., 95% or greater.

Financial institutions also use computerized security monitoring systems to detect suspect financial transactions. Typically, once a suspect transaction is detected, a manual investigation, as described above, is conducted. These security monitoring systems exhibit drawbacks, in that they are based on thresholds not specific to any individual customer, or deviations from the customer's normal activities as they relate to network and/or data assets, or deviations related to a specific data set or asset within the network.

For example, with suspected money laundering, when investigated manually, there is very little data which is usable for analysis of the suspected transaction. This data includes, for example, the origin and destination of the funds, the amount of the funds and the date of the transaction. As a result, such a transaction is difficult to analyze and model for money laundering, leading to a high, e.g., 95 percent, false positive rate.

When suspected money laundering is analyzed by transaction monitoring systems, these systems typically generate alerts based on three main types of analysis. The analysis includes, for example, 1) predefined thresholds, not specific to any user, which might signal Anti-Money Laundering (AML) stages, such as placement (moving money into the account), layering (having the money coming through multiple accounts/channels), structuring (aggregating money several accounts and positioning the funds to exit), and, exit (high risk money out); 2) linking: blacklists, Personal Identification Information (PII) linked to criminal activities, common indicators such as a user name, email, phone, address, Internet Protocol (IP) address, device identifiers or destination/origin account for money transfers; and, 3) anomalous behaviors, for example, deviations from the user's normal activities in their KYC (know your client) profile. Most of these alerts result in a high number of false positives, which are generated because of genuine and non-fraudulent activity.

SUMMARY

The disclosed methods and systems provide for approaching end-users, collecting their information as it relates to a specific suspect event or set of events, for financial events and security events, referred to collectively herein as "security events", and then using Artificial Intelligence (AI) to validate this information, to investigate the event or set of events. The events may include, for example, banking transactions, suspected to be money laundering and/or other illegal currency movements and transfers, or suspect security events within an enterprise.

For example, in the case of bank (banking, financial and/or monetary) transactions, such as suspected money laundering, the disclosed methods and systems bridge the gap between two disjoint functions: compliance, which today is handled in the back office, and, digital transformation, in which users are serviced using remote channels. The system eliminates the large amount of alerts for money laundering, and the subsequent investigations caused by these alerts, with the investigations conducted based on a very limited set of data, which is typically just the transactional profile of the customer/user and their regular activities and monetary transactions.

As a result, any human or AI investigative effort is constrained by the lack of context related to what action the user is attempting to do and the reason/rationale of their actions. In other words, if AI is deployed to help investigate the alerts generated by the anti-money-laundering system, it does not have any reference for any reasons why the activity is occurring.

The disclosed subject matter provides for approaching the users themselves digitally, to collecting contextual information and explanations for the customer/user actions, and then using it for AI driven validation. AI is used to validate the transaction or event, and not determine whether the transaction or event is right or wrong.

With the validation of the event or transaction determined, the system then provides recommended actions and feeds any new information to a KYC (Know Your Customer) function.

As a result of the disclosed methods and systems, the time invested in investigating suspect cases is reduced, the investigations are conducted without human bias, where an investigator may have an opinion of the transaction or the customer, customer insults, caused by limiting or blocking the customer's account access, are reduced due to compliance decisions, and contextual information is added to the detected event or transaction, so that investigators can focus on validating, including, for example, verifying, the event or transaction.

BRIEF DESCRIPTION OF THE DRAWINGS

The present disclosure will be more fully understood from the following detailed description of the embodiments thereof, taken together with the drawings in which:

FIGS. 2A, 2B and 2C form a diagram (joined together as FIG. 2A over FIG. 2B, which is over FIG. 2C) of structured questions for security events which form a question or decision tree used in obtaining information from various users and parties to security events, in accordance with the present disclosure;

DETAILED DESCRIPTION OF EXAMPLES

Methods and systems provide for approaching end-users, collecting their information as it relates to a specific suspect event or set of events, for security events, such as financial events and computer security events, and then applying an Artificial Intelligence (AI) model, to a given security event, to analyze the provided information, to investigate the event or set of events, for validation.

Figure 1:
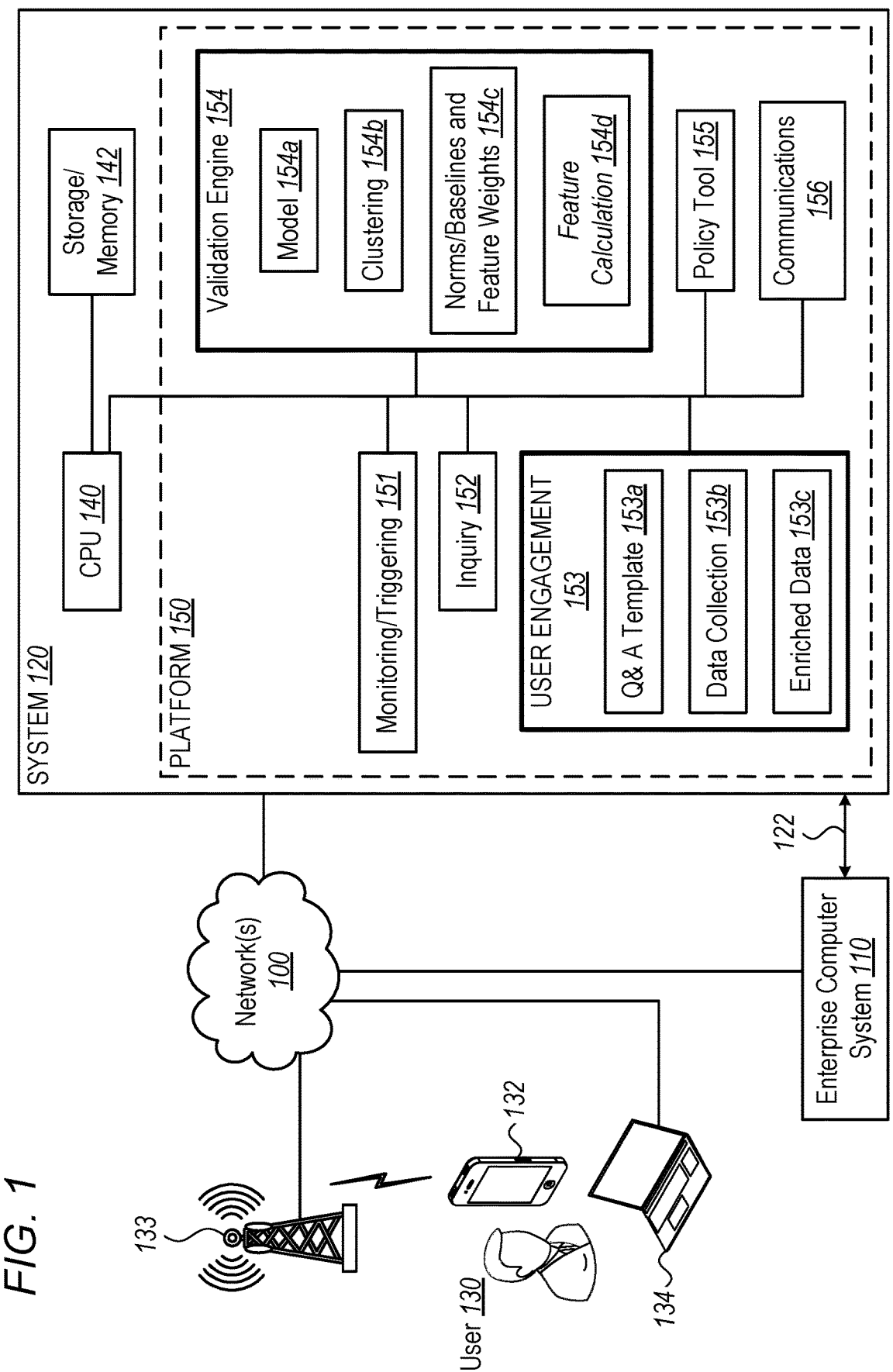
FIG. 1 is an illustration of an example environment showing the disclosed subject matter.

Reference is now made to FIG. 1, which shows an example environment in which the disclosed system and method operates for validating security events, for example, financial and/or security transactions. The environment includes one or more networks 100, which support communications, e.g., electronic and/or data communications, between an enterprise computer system 110, for example, representative of a financial institution, such as a bank, or other organization, each of whose transactions are monitored by a computer system 120, as disclosed herein. The computer system 120 includes a platform (represented by broken line box 150, hereinafter, the platform is referred to as element 150). Both the computer system 120 and platform are shown as part of a single computer system, for illustration purposes, as components of the computer system and/or the platform may be placed over multiple computers/computer systems, as well as in the cloud. The computer system 120 communicates with the one or more networks 100, as well as with the enterprise computer system 110. Communications between the computer system 120 and the enterprise computer system 110 may be via the network(s) 100, or directly, as represented by the double headed arrow 122, and, as such allow the computer system 120, and platform 150, to be used in monitoring the enterprise computer system 110, including, for example, transactions performed fully or partially by the enterprise computer system 110. For example, when the enterprise computer system 110 is that of a bank or other financial institution, various financial transactions, for example, those transactions suspected of being money laundering transactions, are monitored by the platform 150 of the computer system 120.

The Enterprise computer system 110 may include, for example, processors, for example, which may comprise general-purpose computers, which are programmed in software, including trained Artificial Intelligence (AI) models, to carry out the functions described herein. The software may be downloaded to the computer in electronic form, over a network, for example, or it may, alternatively or additionally, be provided and/or stored on non-transitory tangible media, such as magnetic, optical, or electronic memory.

Alternately, the platform 150, formed of the platform components 151-156 detailed below, of the computer system 120 may be integrated into the enterprise computer system 110, into one or more computers, servers and the like, thereof.

A customer/user 130 (the terms "customer" and "user" used interchangeably herein) (e.g., an account holder at a bank, brokerage firm or other financial institution) of the financial institution/enterprise computer system 110, representative of multiple customers/users, communicates with the enterprise computer system 110, and with the computer system 120, via the network(s), for example, through computing devices such as a smart phone 132, tablet computer, or the like (via the cellular network, represented by the cellular tower 133, WiFi®, other on-line connection, or the like, or with his desktop 134, laptop computer, or the like, via WiFi®, other on-line connection or the like.

The networks 100 may include one or more of the Internet, Cellular networks, wide area networks (WAN) (of which the Internet is a public network thereof) and local area networks (LANs), such as an enterprise network.

The computer system 120, which includes the platform 150, includes components, such as various processors, storage/memory, modules, engines, models, interfaces and the like. As used herein, a "module", for example, includes a component for storing instructions (e.g., machine readable instructions) for performing one or more processes, and including or associated with processors, e.g., the CPU 140, for executing the instructions. As used herein, an "engine" performs one or more functions, and may include software programs for performing the processes detailed herein and shown in FIG. 4. Other components are also permissible in the computer system 120, and all components of the computer system 120 and those of the platform, are linked to and in communication with each other, either directly or indirectly. The components include one or more processors, functioning as a Central processing unit (CPU) 140, an associated storage/memory 142, as well as components of the platform 150, which include, for example, a monitoring/triggering module 151, an inquiry module 152, a user engagement module 153, a validation engine 154, and policy tool 155, and a communications interface 156.

The Central Processing Unit (CPU) 140 is formed of one or more processors, including microprocessors, for performing functions and operations detailed herein. The processors are, for example, conventional processors, and hardware processors, such as those used in servers, computers, and other computerized devices. For example, the processors may include x86 Processors from AMD (Advanced Micro Devices) and Intel, or other processors by companies such as ARM, as well as any combinations thereof.

The storage/memory 142 stores machine executable instructions for execution by the CPU 202. The storage/memory 142 also includes storage media for temporary storage of data. The storage/memory 142 also includes machine executable instructions associated with the operation of the platform components 151-155, including the communications interface 156.

The monitoring/triggering module 151 of the platform 150 monitors transactions performed by the enterprise computer system 110, and when a transaction meeting certain predetermined criteria, for example, in accordance with rules and policies of the platform 150, is detected, one or more alerts are generated.

For example, when the monitoring/triggering module 151 is programmed to monitor security events, for example, as financial or banking transactions, such as those which are suspicious of money laundering, the alerts are based on, for example, three main lines of analysis: (1) pre-defined thresholds not specific to any user, that might signal AML stages such as: a) Placement (moving money into the account), b) Layering (having the money coming through multiple accounts/channels), c) Structuring (aggregating money rom several accounts or positioning the funds to exit), and Exit (high risk money out); (2) Linking: Blacklists, PII linked to criminal activities, common indicators such as a user name, email, phone, address, IP address, device identifiers, or destination/origin account for money transfers, etc.; and, (3) anomalous behaviors—i.e., deviations from the user's normal activities and their Know Your Client (KYC) profile, for example, as stored in a database(s) in the enterprise computer system 110. Most alert types will have a high degree of false positives generated by genuine activities.

Similarly, when the monitoring/triggering module 151 is programmed for security monitoring, alerts are generated. For example, the alerts are based on thresholds not specific to any individual user, or deviations from the user's normal activities as they relate to network and data assets, or deviations related to a specific data set or asset within the network.

The alerts generated by the monitoring/triggering module 151, for example, may also include various data points. In the case of suspicious financial transactions/banking activity, the data points may include, for example, account ID, account holder's (user's) first and last name, user's phone number, destination bank routing number, originating bank routing number, transfer amount, alert category and reason codes. The system 120, for example, via the inquiry module 152 receives those data points as an input.

The inquiry module 152 of the platform 150 is responsive to a detected or otherwise determined triggering event or trigger being met and/or subsequently activated, and upon receiving an indication of the trigger/activation, determined whether or not to initiate an inquiry with the user/account holder 130. If the module 152 determines that an inquiry is to be made to the user 130, the module 152 decides the type or types of communications to use to contact the user 130 with the requisite inquiry.

For example, the decision to contact the user 130 may be based on previous user behavior, such as prior interactions between the user and the enterprise, and the degree of collaboration the user has provided to the enterprise, represented by the enterprise computer system 110, either in person, by telephone, or over computer networks. The decision to contact the user 130 may also be made by the application of rules and policies, stored and/or programmed into the inquiry module 152, as well as by an AI triage or other model, such as one using gradient boss or random forest methods, as detailed below.

Additionally, should the alert be of a certain alert category, the module 152 may decide to make contact with the user 130 in accordance with specialized policies, or based on a specific circumstance.

When the inquiry module 152 determines that the user/account holder 130 is to be contacted, the module 152 selects the correct communication method, channel and strategy for the specific case. Factors influencing the communication method and communication strategy include, for example:

1) A result of last inquiry—did the user provide information? For example if the user/account holder 130 consistently provides information to the financial institution/enterprise when asked, this will make it a higher priority, than the user, who seldom or never provides information to the financial institution/enterprise, for any reason.

2) Date of last inquiry—if the date is close to the currently detected event, the module 152 applies risk based decisioning. For example, if the last inquiry was within the past week, then only high-risk cases could be triggered. If the user never had an inquiry, then thresholds can be lowered.

3) Number of inquiries in a predetermined time period. Should the user have been contacted more than a certain number of times, in a certain time period, the module 152 applies a risk based decisioning.

4) User's/Customer's 130 (e.g., Account holder, if a banking or other financial transaction) channel utilization—branch, phone versus online/mobile banking—This user behavior influences the way to approach the user and may be combined with some of the other features listed herein for the module 152. For example, if the user 130 rarely performs activities in the actual financial institution in-person, and normally uses mobile banking, the user 130 should be approached via the mobile banking application and channels. However, if the user 130 normally uses in-person services, the inquiry may be forwarded to their financial institution, for an in-person inquiry.

5) Date of transaction: Certain transactional anomalies may be the result of specific events, which are tied to an important date, such as school graduation, a wedding, or the like, where large amounts of money may be transferred to another party as a gift. For example, someone who has never received large money amounts from various accounts and is then sent a few transfers to service providers normally involved with organizing social events might be the 'bursar' of a class graduation event, which would typically happen around May-June timeframe.

6) Alert code/reason/category data—This would produce category-specific policies, in combination with some of the other features. For example, if the category is "suspicious money coming in from a high risk source", there is a higher chance that the decision might be to block the account from receiving the funds, or even reverse the funds direction and send them back to the origin. In such cases the policy might reduce thresholds for other elements because it is better to get the user's input before the decision is made, rather than risk an 'insult' if the money is not accepted by the bank and the user later complains. If, on the other hand, the category is "suspicious money coming in from a known source of money laundering", and some of the other alert details such as amount show higher risk, the module 152 may decide not to inquire at all and recommend a report to the authorities without contacting the user. However, if the category is "suspicious money coming in from an unknown source", this is considered medium-risk and there will not be any aggravating or relaxing effect on the decision of the inquiry module 152.

7) Transactional history of the user. Those features will help fine-tune the decisions based on the user's baseline behavior. For example, a user that never sent money internationally and the triggered event relates to an international transfer—will be treated differently than a user who has made previous international transfers, and a user who has made transfers to a specific country before. Other examples might include transaction velocities, monetary amounts of the transaction, the ratio of new beneficiaries to old beneficiaries.

8) Transactional history of users of similar KYC profile. Those features will help set policies in case of thin or no user history. For example—people of similar profession and tenure in that profession, age of children, marital status.

9) Transactional history of users with similar triggered events. Those features will help set policies in case of thin or no user history, and also thin or too-generic KYC details. For example, users who send a significant amount of money internationally for the first time; users who receive a large amount of money from an online trading company and then move large sums to other bank accounts.

Alternately, not every trigger received requires the module 152 to communicate with the user 130. For example, this non-communication may be very lightweight, automated, and has low friction. For example, with money laundering, internal governance policies may block certain investigations from contacting the end-user, in order to not 'tip them off'. The same would hold true for certain security investigations, for example, in cases of a strongly suspect intruder or imposter, with control, including full control, of the customer's assets.

In other instances of not contacting the customer in response to a trigger being activated, the team responsible for operating the system may take a risk-based approach, deciding that contacting the user would be done only if the risk passes a pre-configured threshold. It should be noted, that a user 130 who is constantly approached to clarify certain actions will have a higher 'insult rate', and the module 152 can be configured to aggregate inquiries or filter out small to medium risk alerts.

In other instances of not contacting the user (customer) 130 in response to a trigger being activated, a customer who prefers communicating, in-person, by phone, or on-line, with their financial institution, may be subject to less alerts. As a result, suspect cases may be transferred to the branch personnel of the financial institution who might know the context for specific activities.

The module 152, for example, typically includes a trained model, such as an artificial intelligence (AI) or machine learning module, which provides reports that show the input elements and the recommended decision, including reason codes and statistical aggregates, so the investigation team can understand the historic and current trends of triage decisioning. The AI model (associated with the module 152) may be, for example, a naïve Bayesian model with a threshold. Other suitable models may be based on gradient boost and random forest methods, depending on the data and/or the circumstances.

The inquiry module 152 may also be programmed to sample non-triggered transactions. For example, the module 152 will engage in a certain, configurable sampling of non-alerted transactions in order to mask the alerted cases. This will create 'red herrings', i.e., misleading or distracting clues or inferences, and avoid tip-offs where criminals will be able to reverse engineer the logic of alerts. In other words, the system 120 of the platform, via the module 152, will trigger not just upon receiving alerts, but will also self-trigger to query transactions that did not generate an alert but have certain other characteristics such as high amounts or an anomalous aggregate of money transfers. In such cases the system will generate an automated inquiry that will be identical to that generated following a triggered case.

The sampling, by the module 152, is, for example, also used to receive a benchmark reply in similar cases, enriching the user versus crowd validation process, detailed herein below. The module 152, will, for example, also check whether the responses for alerted users are significantly different than those of non-alerted users with similar transaction anomalies. Additionally, the sampling by the inquiry module 152 will also allow a greater degree of A/B testing for user experience (UX) purposes. For example, there will be a large sample size from which various types of questions/phrasing of questions/decision tree branches, may be checked.

The user engagement module 153, for example, functions as a data collection interface, and also communicates with the user 130 over various remote or digital communication channels. The communication channels include, for example, text message, email or instant massage via a mobile/desktop app with link to the data collection component; voice call to the user's number on record; chatbot operating within the service provider's online/mobile application; push notification via online/mobile application—which can be set for the next time the user accesses the application. The message presented to the user during this initial engagement, for example, provides, context information such as, user name, date and time of transaction, amount of transaction related to the alerted case. This will reassure the user that the information is genuine and legitimate.

The module includes three portions, or sub modules 153a-153c. The first submodule 153a, includes a question and answer template, which creates a set of questions, either a complete set, or for a decision tree, where the answer to the previous question or questions causes dynamic generation of the next question. The answers to the questions are collected by a data collection submodule 153b. Am enriched data module 153c augments (modifies) the received data, for example, adds the location of the user's 130 device 132, or computer 134, and/or alternately removes irrelevant data to/from the information (data) obtained by the data collection submodule 153b. This data may also be used, for example, when the submodule 153a determines which questions to ask the user 130.

Once the user 130 begins the interaction (e.g., electronically) with the module 153, for example, the question and answer template submodule 153a creates various questions for the user, for example, one or more structured questions (FIGS. 2A, 2B and 2C), by operating using a dynamic decision tree, freeform data collection using natural language processing (NLP), or both.

Figure 2B:
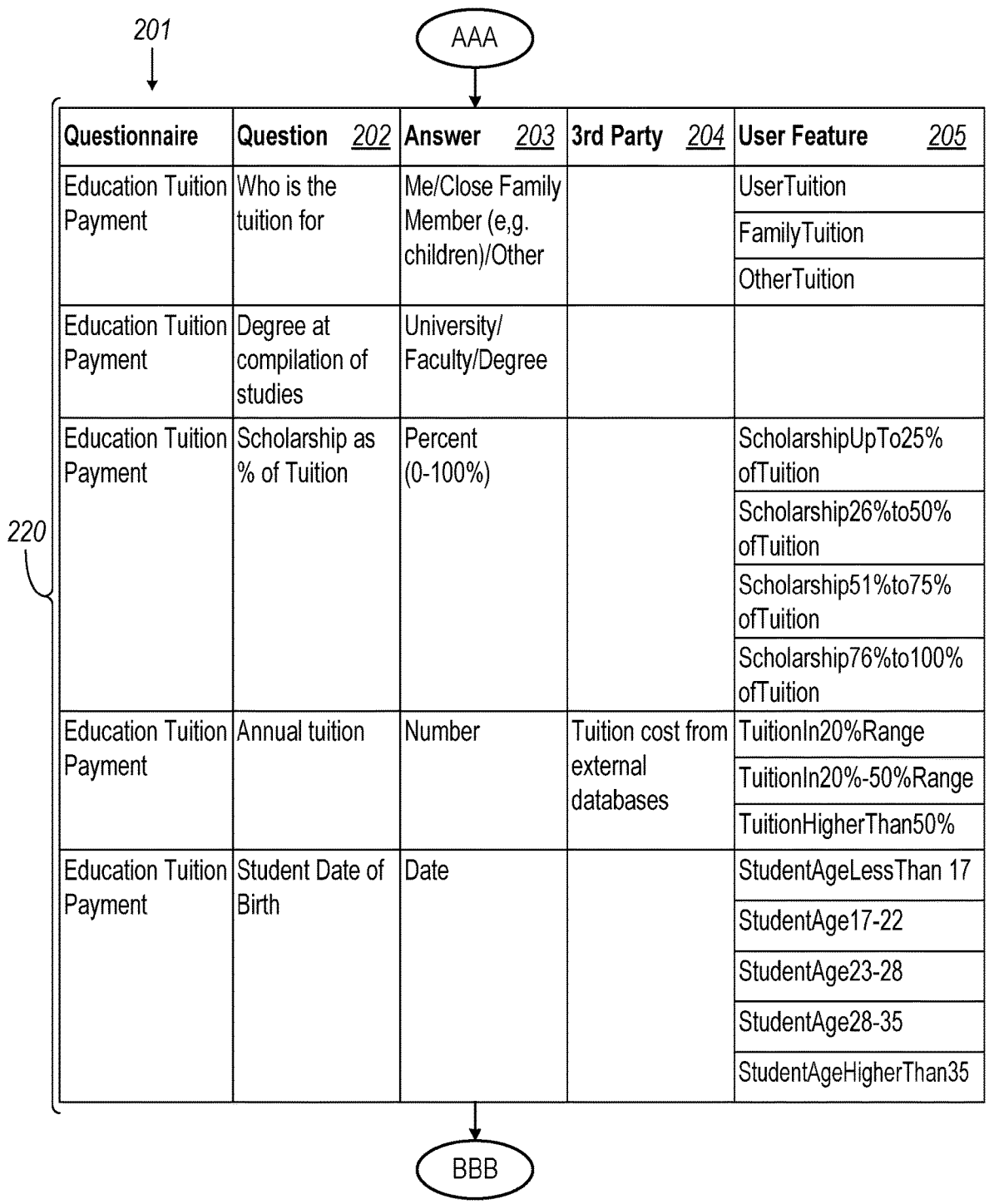
Figure 2C:
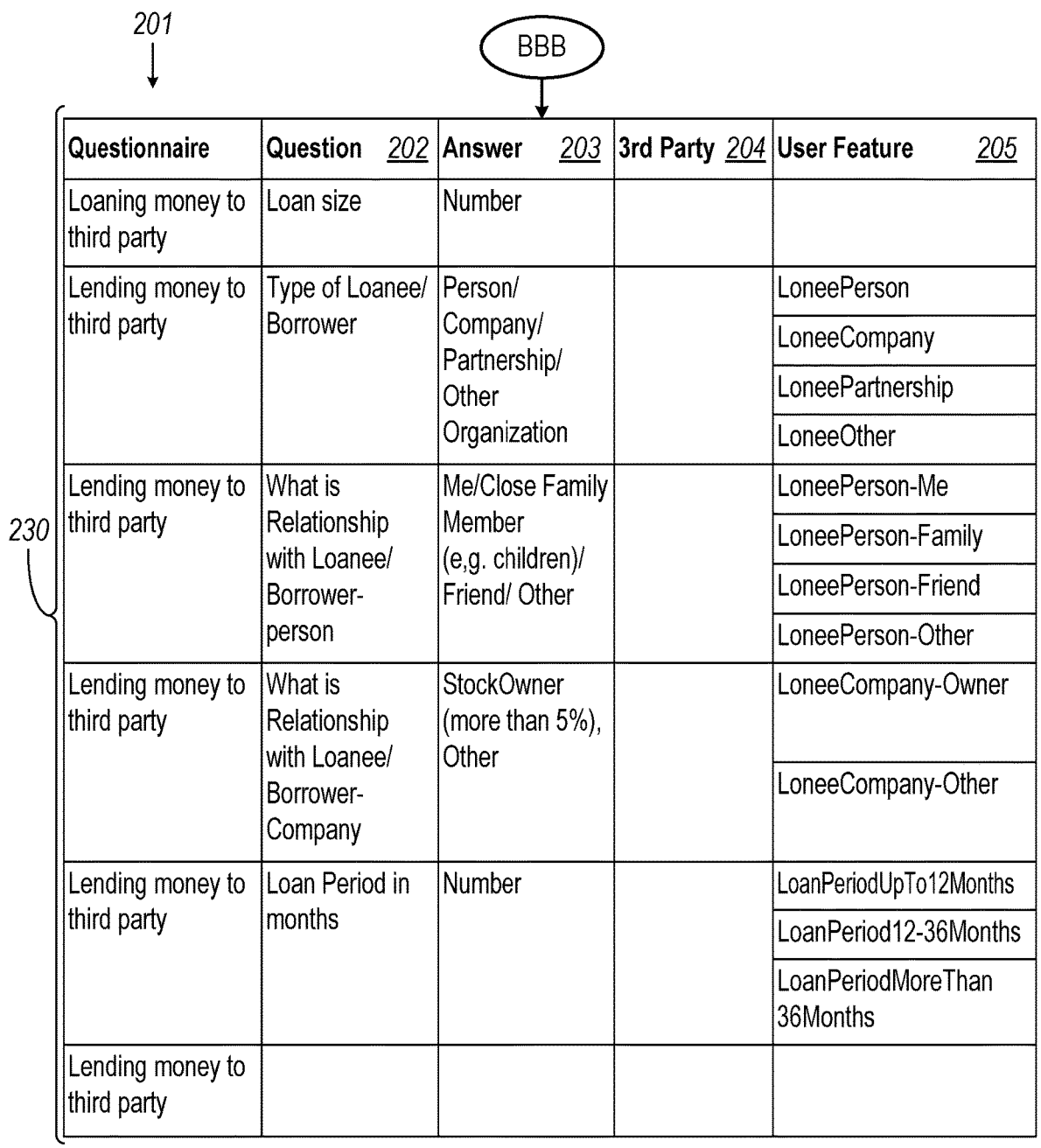

For example, FIGS. 2A, 2B and 2C show a template of structured questions, which, for example, are dynamic, and arranged, for example, as sets of one or more questions, which are used to form a decision tree. The set of one or more questions, is based on information obtained by or provided to the platform. For example, if the security event is a real estate purchase, one or more questions from a set 210 of structured questions, for example, those of FIG. 2A for Real Estate purchases, may be output by the submodule 153a, in an electronic document, the form of a questionnaire, presented or otherwise transmitted to the user 130. These questions are used, for example, to obtain the user/customer's life story, to obtain information, typically translatable into data points, for use when the model 154a is trained and applied.

The system 120 and platform 150 are a "big data" system, as the system operates on data sets that are too large or complex to be dealt with by traditional data-processing application. The collection of data is initially large in volume, but grows exponentially with time. The system 120 and platform 150 operate with multitudes of data obtained from multiple users/customers life stories (potentially into the millions of life stories), for various types of security events, including banking and financial transactions, such as money transfers for real estate purchases, tuition payments, gifts, and the like, and security situations for one or more computers on a network, such as an enterprise network (a local area network (LAN) associated with the enterprise computer system 110). The information is obtained over time, such that the model 154a is dynamic, as it is adjusted to accommodate changes which occur over time.

As shown in FIG. 2A, Real Estate Purchase Structured Questions 210, FIG. 2B, Tuition Payment structured Questions 220 and FIG. 2C, Loan structured questions 230, for example, the questions (e.g., structured questions) may be part of a "Questionnaire" 201 in column 1, presented to the user 130, to obtain the user's life story, with the norm or baseline for the answer provided under the "User Feature" 205, of Column 5. Column 2 is the actual "Question" 202 in the questionnaire, Column 3 is the "Answer" 203 and its parsing, and Column 4 is the type of information obtained by third party checks 204, such as Google® Street, Zillow, Redfin and other real estate web sites.

As an example operation by the submodule 153a of the module 153, there are two sets of questions, each set representing branches of a decision tree:

Branch 1

Question (Q): Does the account in My Trade belong to you?
Answer (A): Yes
Q: What is the purpose of the deposit? A: Payment for real estate
Q: Have you ever been in the apartment? A: Yes
Q: How much did you buy the asset for? A: $500,000
Q: What is the Address for the asset you are purchasing? A: 1020 W Addison St, Chicago, IL 60613

Branch 2

Question (Q): Does the account in Mexico belong to you?
Answer (A): No
Q: What is the purpose of the transfer? A: Money I am moving to a family member
Q: What is the name of the family member? A: Alice Jones
Q: What is the relationship between you and the family member? A: Daughter
Q: What is the main purpose of the funds? A: Student Tuition
Q: What is the total sum you plan to send to that person in the next 2 years? A: $35,000
Q: What is the name of the academic institution the student is studying in? A: Mexico City Medical University The questions selected to be presented to the user 130 may, for example, be influenced by the device 132 or computer 134 (of the user 130) location, as determined by the submodule 153c.

The user 130 will interact with the data collection submodule 153b and provide his answers to a set of questions, i.e., the questionnaire, typically electronically over a communications network 100, with the answers related to the specific case. The platform 150 can allow the user 130 to respond at a later time, request that the questions be read via voice, or request to talk to a bank representative.

The platform 150, via the submodule 153a, for example, permits customizing the generic decision trees, creating new decision trees to cover emerging investigation needs, and sharing decision trees between enterprises, which use the platform 120.

The validation engine 154 includes a model 154a, which is trained and downloadable to one of more computers, such as those of the enterprise system 110, a clustering module or clusterer 154b, a Norms/Baselines and Feature Weights module 154c, and a Feature Calculation module or feature calculator 154d.

The clusterer 154b is used, for example, during training of the model 154a, to create clusters of data points, from which norms or baselines for the data points are created. The norms or baselines may, for example, by indicators and/or boundaries of anomalous behavior, suspiciousness, or the like. The clustering is performed by conventional clustering processes, for example, implemented as computer algorithms.

The Norms/Baselines and Feature weights module 154c is used in model 154a training and application. This module 154c, for example, analyzes the cluster by calculating the norms or baselines for each of the data points (for example, each of the norm or baseline data points having values) of a set of data points of the cluster, with the calculation being continuous, as more data points enter the validation engine 154.

This module 154c also calculates or is programmed to accept feature weights (also known as weight values) for various groupings of two or more data points from the cluster. The calculating of the weights is continuous, as new data points enter the validation engine 154, for example, during training, as training is an iterative and cumulative process. Also, new data points may be added to a group of data points, such that the feature weights involving these data points needs is adjusted to accommodate the new data point. This module 154b also stores the norms or baseline for each data point (set) and the feature weights for each group of data points.

For example, one data cluster, for people (individuals) A, B, C, D and E, all of whom, identify, from their questionnaire, for example, as dog walkers is as follows:

A is in New York City and deposited $500 last month into her account, she has five mentions as a dog walker on social media (the social media mentions a result of third party checks)

B is in New York City and deposited $700 last month into her account, she has three mentions as a dog walker on social media, and two advertisements for dog walking on Craig's List C is in Denver and deposited $450 last month into her account, she has one advertisement for Dog Walking in a local Internet Publication and two advertisements for dog walking on Craig's List D is in Philadelphia and deposited $850 last month into his account, he zero social media mentions or advertisements for dog walking E is in Boston and deposited $9000 last month into his account, he has a social media picture showing him with a dog, but nothing specific to dog walking There are two data points which form a group: 1) the amount deposited per month, and 2) number of social media/electronic mentions.

For each of the individual data points, a set of data points is made, for example, from the data point (data point group member) "amount deposited last month", as follows:

| USER/CUSTOMER (Account holder) | AMOUNT DEPOSITED LAST MONTH (Dollars) |
|---|---|
| A | 500 |
| B | 700 |
| C | 450 |
| D | 850 |
| E | 9000 |

The weighting for the groups (group members) of the cluster may be as follows:

| WEIGHT (Percent) | DATA POINT (Group Member) |
|---|---|
| 80 | The amount deposited last month |
| 20 | The number of social media/electronic mentions |

The feature calculation module or feature calculator 154d calculates features, which are fed into the model 154a, when the model is applied to a given security event, as detailed below. For example, a feature is calculated as the distance between the data point (e.g., data point value) for the norm or baseline stored in the validation engine 154 module 153c, and the corresponding data point (e.g., data point value) for the given or instant security event (during both training the model 154a, and applying the model 154a).

While one data cluster has been discussed, the platform 150 is designed to work with multitudes, typically into the millions, of clusters, which are mapped over time. Life stories of individuals, based on their security events, or portions of the life stories, may be used in one or more clusters at any given time. By using "big data" a close or exact match of one or more life stories may be used in analyzing a given life story when both training and applying the model 154a. For example, Person A (above) may be in one cluster for "dog walkers", but may be in another different cluster for "household workers in New York City", or "individuals living and working in an urban business district".

The model 154a is trained for various situations. The data gathered from the questions, including answers from the decision trees, is used to train the model 154a. The data collected over time is analyzed in order to achieve a normal distribution, which forms the trained model 154a.

The AI model 154a of the engine 154, as trained, for example, receives feedback from the human investigations team so the machine learning component can learn whether the recommendation to contact the user and the type of the contact, was in line with the human team's recommendations. This will allow a supervised machine learning system to cause adjustment of the AI model 154a. As the model 154a is constantly being adjusted based on continuous training, the model 154a is, for example, dynamic.

The data obtained for the model 154a, the data ultimately being normalized for the model 154a is obtained, for example, from questionnaires or inquiries in response to the platform 150, e.g., the inquiry module 152, receiving an alert or activated trigger resulting from detection of suspected Fraud/AML/Security breaches and/or violations.

The questionnaire is, for example, in one or more forms, for example, of structured questions, and one or more of these forms may be provided to the user 130. These forms include, for example, questions or chat with structured responses, freeform chat using NLP or Voice, or a question form for the user to fill in with words, yes/no, or combinations thereof. Each questionnaire, for example, typically includes multiple questions. Also, there is typically a many-to-many relationship between the questionnaires and the questions.

The user 130 answers to questions from the questionnaires, decision trees, and other questions posed to the users, are, for example, augmented with Boolean values that are fed into the AI engine and derived from the answer to the question and/or third party data when relevant. For example, such third party data may be a home price in a specific neighborhood, taken from a real estate price database, such as Zillow (www.zillow.com) or Redfin (www.redfin.com).

The data for training the model 154a is also obtained from a User versus Crowd analysis. While most answers received from users are genuine, the goal of the User versus Crowd analysis is to use the "wisdom of the Crowd" to set a benchmark for answers that are within the computer-established norm. Answers which fall outside of the norm are, for example, considered high risk, than those which fall within the norm. Cases that the system assesses as high risk may require further investigation or validation, and are, for example, flagged.

In creating the model 154a, additional factors may be considered to determine the genuineness of the answers by performing an intent analysis. This intent analysis involves, for example, tracking mouse, keyboard and touch events. For example, the platform 150 (e.g., the data gathering module 153b) obtains data concerning features, such as the speed the answer was entered (input) into the user's computer/device, the number of times the entered answer was edited including being corrected, or erased and changed, any hesitation in providing the answer, such as hesitancy to provide monetary amounts, or the speed (time) in which the question is answered (the first data to answer the question is input).

Once the data has been entered or otherwise input, third party checks may be performed on this data. These third party checks will further validate the data received, to determine whether this data should be used to in establishing the norm for the model. The third party data sources include, for example, individual and business registries, real estate or stock exchange information, and the like, including on-line data sources, such as web sites and the like.

Additionally, in cases which are determined to be high risk, the user 130 may be asked to go through additional challenges or procedures to provide more context data that can be independently verified. An example might be presenting photos of a property from a provided answer, a photo of the university selected as the reason for an international tuition payment, and the like.

The model 154a generates and outputs metrics, for example, corresponding to the validity of the transaction. The metrics include, for example, 1) a score, as to the risk of the security event, known as a "risk score", for example, zero (0) being a low score or low risk (if any risk at all) to high risk at 100, and 2) reasons for finding the given security event to be suspicious or not suspicious, either specific written reasons, or as codes.

The model 154a may also be trained to make various recommendations and/or predict decisions, which for example, are based on any one or more of the generated metrics. For example, based on supervised tuning, discussed below with respect to FIG. 3, when training the model 154a, actual decisions to investigate a case or issue a Suspicious Activity Report (SAR) are known and attached to the various security events from the life stories (and typically also information therefrom) used to train the model 154a, such as from life stories of one or more security events, for example, a financial or bank transaction, such as a funds (money) transfer. As a result, the model 154a is, for example, trained to predict decisions and/or outcomes, and/or issue alerts, for various security events, which the model 154a analyzes, such as financial and bank transactions. The model 154a may also be such that the predicted decisions and/or outcomes, and/or issuing of alerts, from the model 154a are part of a fully automated process performed by the model 154a.

The model 154a, for example, includes a classifier, trained to predict outcomes and/or decisions, and/or issue alerts, based on the outputted risk score, for example, the risk score as detained above.

Additionally, the model 154 may be trained to look at various indicators, in performing its analysis. Staying with the example of the cluster of Persons A through E above, a life story from a given dog walker Q in Seattle may have a high deposit account amount of $9500 last month. This resulted in the model 154a outputting a "high risk" score for this person Q, and the model 154a further predicted that a SAR would be issued for this person. However, an "indicator" of "published services on-line" showed three Internet advertisements for dog walking in Craig's List for Seattle and suburbs, as well as advertisements for dog walking in over fifteen electronic publications of suburban newspapers for the Seattle area. Based on the indicator, the model 154a automatically and immediately cleared this person Q and her financial transaction of any suspiciousness.

The policy module or policy tool 155 analyzes the output from the model 154a. The policy tool 155, for example, writes business logic or rules that use the model's output and reason codes, as well as any enriching data points, to make recommendations such as: GOOD—Close investigation, ESCALATE, ASK FOR MORE INFORMATION, REPORT—report to authorities as suspicious, or CUSTOM—a custom decision unique to the particular case.

The communications module 156 serves to facilitate communications between the platform 150 and the network(s) 100, as well as with the enterprise computer system 110.

Figure 3:
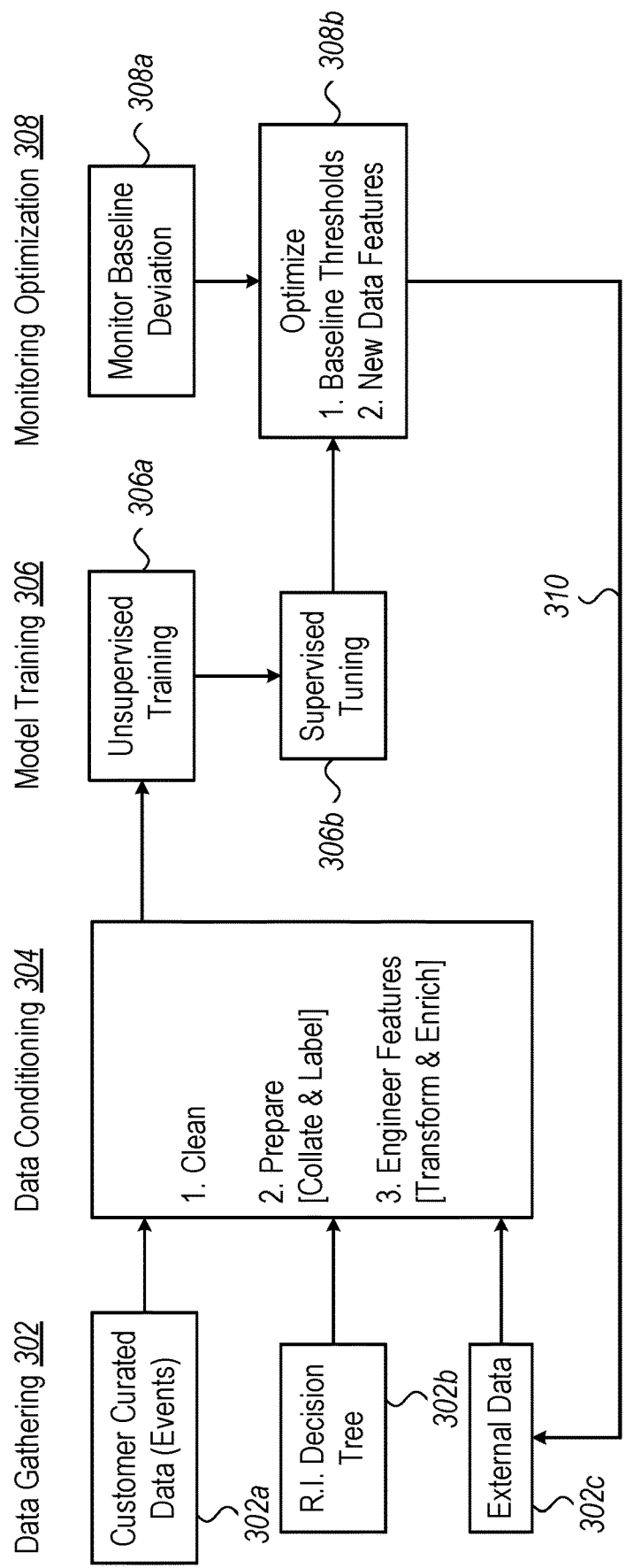
FIG. 3 is a diagram of the modeling cycle for the model of the present disclosure.

FIG. 3 is a diagram illustrating the modeling cycle for training the model 154a. The model 154a is such that it is an AI model which ingests (receives input) data from an external system, for example, the enterprise computer system 110, in particular, a risk detection system associated with the enterprise. The risk detection system, for example, typically produces high false positive events, generated by human behaviour. A structured decision tree, as detailed above, collects and resolves specific context and parameters thereof. The high false positive ratio along with the answers provided in the decision tree will represent the "good" population. Over time, these answers by the "good" population will produce a baseline of "good" user anomalies.

This baseline (or norm) can then be applied against new, incoming or given events, to determine good or bad user anomaly events, and remove incorrect information from the originating risk detection system. The input layer (Data Gathering) 302 includes metrics and parameters developed to feed the model. 'Customer Curated Data' 302a includes parameters such as alert type, transaction details and customer information. The Decision Tree 302b, for example, curates curate additional enriched data such as explanation for the transaction along with deploying behavioural biometrics such as the timing and movement behaviours during and between each question, and implement a red herring strategy throughout the decision tree. 'External Data' 302c is used, for example, to enrich and validate the Decision Tree 302b data results such as customers' employer or education.

All three data sources 302a-302c are then, for example, conditioned via a data conditioning layer 304. This conditioning includes one or more of cleaning the data, preparing the data, and engineering features of the data.

Cleaning the data, for example, involves removing outliers that would distort a data cluster, the data clustering explained further in the unsupervised training of block 306a, and supervised training of block 306b. For example, if an average dog walker in New York City deposits $500/month in her bank account, but dog walker X in New York City deposits $10,000 per month in her bank account because she walks dogs for celebrities, her data point of $10,000/month (e.g., a the value for the data point) would be cleaned before it would be placed into the cluster analysis of the unsupervised training of block 306a. Similarly, if it was known that dog walker Y, also in New York City, deposited $20,000 for two straight months in his bank account, and the bank issued a Suspicious Activity Report (SAR), this data point would also be cleaned prior to the cluster analysis.

Preparing the data typically involves collating and labelling the data. An example of collating the data includes Alert metadata with Q&A response and enriched data. For example, information is returned from various life stories, using the terms "New York City", "NYC", "Manhattan", and "New York, NY". All data points related to these terms, would be collated under the single term "New York City".

An example or labelling the data includes assessing against historic results (e.g., known or actual outcomes of the security event) fed through analyst decision feedback loop. Engineering features of the data includes, for example, transforming and enriching the data. An Example transformation of the data is formatting and normalizing to align with the existing schema, for example obtaining data points and values for the data point from the received data. Example data enrichments include has this dog walker advertised their dog walking business online.

The next layer is model training 306. Here the training includes unsupervised training 306a and supervised tuning (or training) 306b.

The data is now subjected to unsupervised training of block 306a, where, for example, based on data points, the data is clustered, for example, the cluster typically defining a group of member data points. One data cluster, for people A, B, C, D and E, all of whom, identify as dog walkers is as follows:

A is in New York City and deposited $500 last month into her account, she has five mentions as a dog walker on social media (the social media mentions a result of third party checks)

B is in New York City and deposited $700 last month into her account, she has three mentions as a dog walker on social media, and two advertisements for dog walking on Craig's List C is in Denver and deposited $450 last month into her account, she has one advertisement for Dog Walking in a local Internet Publication and two advertisements for dog walking on Craig's List D is in Philadelphia and deposited $850 last month into his account, he zero social media mentions or advertisements for dog walking E is in Boston and deposited $9000 last month into his account, he has a social media picture showing him with a dog, but nothing specific to dog walking The data cluster is now passed to supervised tuning, at block 306b. Supervised tuning is used to train the model to make decisions as to whether the security event, i.e., the deposit transaction is suspicious and should be flagged, for further investigation, reporting, or the like. At block 306b, features of actual and typically previous, security events are mapped or otherwise correspond or linked to actual outcomes (or decisions) of the security event (the outcomes, for example, suspicious/not suspicious, flagged/not flagged, alert issued/alert not issued).

For example, at block 306b, external feedback from an external person or persons, such as an AML team, is applied to each of the transactions of persons (individuals) A-E, to train the model 154a. The External feedback was such that D's transaction received a suspicious activity report (SAR) and E's transaction was reported to authorities, while the external feedback on the transactions of A and B were not considered suspicious and not flagged. C's transaction was not provided external feedback.

The supervised tuning at block 306b typically also involves weighting features resulting from data points. Using the data of individuals A through E, Feature 1 is the distance between the norm or baseline amount for the deposit, which is $500, and Feature 2 is the distance between the norm or baseline for social media/advertisement. For example, for A, Feature 1 is at the norm and Feature 2 also meets the norm. For E, Feature 1 is 18 times the norm and Feature two is also distant from the norm, with 0 (zero) when the norm is 3.

Initially, the weighting may be 80% to Feature 1, and 20% to Feature 2. However, from external feedback, based on the fact that action was taken on both D and E, who has no social media/advertising evidence of being a dog walker, over time, the weighting may shift to 35% Feature 1, and 65% Feature 2. Additionally, based on the supervised tuning over time, the system may continue to adjust parameters based on external feedback, as to the various transactions.

The supervised tuning of the model 154a continues to be monitored and optimized at block 308, as the model 154a is, for example, dynamic and able to adjust to changing conditions and circumstances. Here, baseline deviations for all members of the data cluster continue to be monitored, at block 308a, so that the baseline or norm for the requisite data point can be adjusted for the model, as block 308b. Similarly, at block 308b, the weighting for features may be adjusted and as additional data points are added to the cluster, new data features, based on new data points, may be added, for example, new data point being the number of dogs the walker has as clients. This new feature, as well as additional new features, are then typically weighted with respect to the existing features.

Data points in the cluster may also include intent behavior analysis, such as the time it took the person to answer the question where they stated they were a dog walker. For example, the norm may be three seconds, as A, B and C, answered in three seconds or less. D answered in 10 seconds after deliberating, and E answered in 15 seconds, first saying that he was a landscaper, but deleting this statement in favor of a dog walker.

From block 308, the model training is continuous and iterative, as new data points are added to the cluster to further train the model 154a, as indicated by the arrow 310. The model cycle is, for example, a cumulative process, and dynamic.

Updating KYC Profile

The final step is for the enterprise system 110 to use the new user input for updating their current KYC profile. This enables a more accurate KYC profile as well as avoiding future alerts that are triggered by the same gap from the KYC profile on record.

Figure 4:
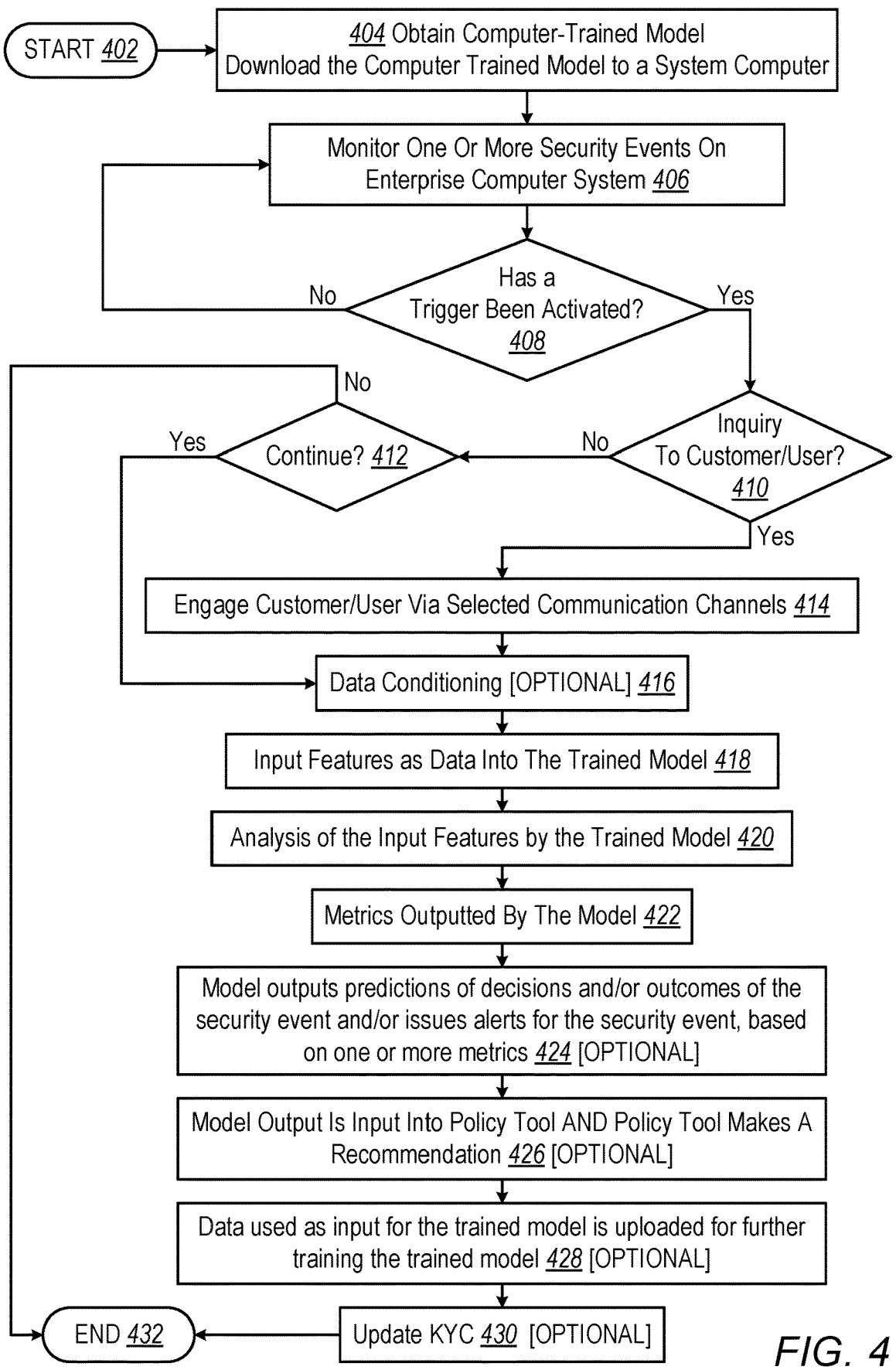
FIG. 4 is a flow diagram of an example process performed by the platform of the present disclosure.

Attention is now directed to FIG. 4 which shows a flow diagram detailing a computer-implemented process in accordance with embodiments of the disclosed subject matter. The aforementioned process, which includes subprocesses, is performed, for example, automatically and/or in real time. The process is performed for a security event, which is, for example, a financial transaction, such as money moving through an enterprise such as a bank, brokerage, or other financial institution, including, for example, the user's account, or a security situation, such as an event on a computer network, such as that of the enterprise.

The process begins at a START block 402, where the local computer associated with the enterprise computer 110, is activated.

The process moves to block 404, where a model, e.g., a computer trained model 154a, is obtained, downloaded and activated, on the local computer. The computer trained model 154a distinguishes among one or more pieces of data received as input to determine whether a security event is validated or should be flagged for further investigation, reporting or the like. The model 154a is trained as detained above, for example, as described with reference to FIG. 3, with the trained model 154a having access to norms or baselines for various data points and able to receive features for evaluation, the features calculated based on a distance between the data point for the requisite activity and the norm or baseline for the data point, as established by the validation engine 154.

The model 154a, for example, develops the features used from a User versus Crowd analysis. In such an analysis the feature is calculated as the distance between the data point for the norm (or baseline) stored in the validation engine 154 and the corresponding data point for the given security event. The model 154a is trained to analyze the received features accounting for the weights of the features, to determine whether or not raise an alert or flag the security transaction. The features are, for example, derived from previous security transactions. The model 154a finds baseline data points from security events the same or similar to the given security event for the millions of data points from the previous collected life stories and clusters.

For example, once the features reached a certain threshold, and the assigned feature weights were accounted for, an alert or flag could be issued for the security events learned from previous computer analysis of a multiplicity of previous security events (e.g., features associated with the previous security events). The trained model 154a, upon analyzing the received features, outputs metrics, for example, 1) a score, as to the risk of the security event, for example, zero (0) being a low score or low risk (if any risk at all) to high risk at 100, and 2) reasons for finding the given security event to be suspicious or not suspicious, either specific written reasons, or as codes. As discussed above, the trained model 154a can also, for example, automatically, predict decisions and/or outcomes (e.g., whether the given security event will receive an SAR and/or investigation), and/or issue alerts, having been trained by supervised tuning, where actual outcomes of various security events, were trained into the model 154a.

With the model 154a and the platform 150, for example, now downloaded to, and activated on the enterprise computer system 110, or one or more computers associated with the enterprise and/or the enterprise computer system 110, the process moves to block 406, where the enterprise computer 110 systems and the security events performed thereon are monitored, for example, by the monitoring/triggering module 151. The security event is analyzed, for example, based on rules and policies, at block 408, to determine whether a trigger has been activated. For each security event, an Account Identifier (ID)/Session ID is assigned to the security event, names, phone numbers of customers/users are obtained, routing numbers, and amounts, if a financial transaction, and any categories or reasons for the security event are known. Should the module 151 determine that the Security Event did not result in a trigger being activated, the process returns to block 406, from where it resumes. Alternately, should a trigger be activated, the process moves to block 410, where the data received is input into the inquiry module 152.

At block 410, the inquiry module 152 determines whether an inquiry will be made. This is done, for example, by evaluating rules and policies, or using a triage AI model, such as a naïve Bayesian model with a threshold, or other model, as detailed above, for example, depending on the circumstances. Should an inquiry not be made at block 410, the process moves to block 412, where it is determined whether the validation process for this security event will continue. If no, at block 412, the process moves to block 432, where it ends. If yes, at block 412, the process moves to block 416, where the data for given security event is optionally conditioned, and the process moves forward from block 416, as detailed below.

Returning to block 410, should the inquiry module 152 determine that an inquiry is to be made, the process moves to block 414. At block 414, the inquiry module 152 determines the form in which the customer/user will be contacted, for example, the selected Question Template, transmitted electronically, in forms such as email, SMS, text message, social media, WhatsApp®, chatbot, or, by a voice call. Once the user 130 begins the interaction with the platform 150, for example, the user engagement module 153, e.g., data collection sub module 153b, will operate, using a dynamic decision tree, freeform data collection using Natural Language Processing (NLP), or both.

Optionally, the process moves to block 416, an optional process performed on the received data including for example, data conditioning. The data conditioning, as discussed above, may include one or more of, cleaning the data, preparing the data, for example, collating and labeling the data, and engineering features of the data, for example, transforming and enriching the data. The cleaning may, for example, include removing: outliers, data not meeting a threshold, unnecessary elements, erroneous data, and, corrupt data, such as data in incompatible formats.

The data from either block 414 alone, or also conditioned from optional block 416, is input for the trained and running model 154a, as the process moves to block 418. As input, the data received from one or more of answers to questions, data from individuals or organizations familiar with the user's behavior (e.g., the user's personal banker), data from third party checks and data from intent behavior, e.g., how the user answered the questions, time taken to do so, and the like, is provided, and data points obtained from this data, for the given security event. For example, a User versus Crowd analysis is performed on the data points obtained from the data of the given security event, as these points (e.g., values of each of the data points) are evaluated for distance from a baseline or norm for the corresponding data point (baseline or norm data point value), to create features. This feature calculation is performed, for example, by the feature calculation module 154d.

At block 430 the features are input into the trained model 154a. The model 154a analyzes the inputted features, accounting for the assigned feature weights, and, at block 422, outputs metrics, for example, 1) a score, as to the risk (risk level) of the security event, for example, zero (0) being a low score or low risk (if any risk at all) to high risk at 100, and 2) reasons for finding the given security event to be suspicious or not suspicious, either specific written reasons, or as codes. The risk score is indicative of whether (e.g., the likelihood) the security event can be validated. For example, the lower the risk score, the greater the likelihood of validation.

From block 422, the process moves to blocks 424, 426, 428 and 430, any one or more of the processes of these blocks is optional.

At block 424, the output metrics, one or more, from the model 154a, are used by the model 154a to output predictions of decisions and/or outcomes of the given security event, and/or issues alerts for the given security event.

Moving to block 426, the output from the model 154a is input into the policy tool 155, and, the policy tool 155 applies rules and policies to the input (model 154a output from block 422), to render a decision outcome as to the validation. For example, these outcomes include GOOD, where the security event is validated and any investigation can be closed, ESCALATE, where the security event is to be further investigated, for example, by the customer's risk operations team, ASK MORE INFORMATION, where more information needs to be obtained from the customer/user, REPORT, where the security event cannot be validated, and should be brought to the attention of the enterprise of other authorities, and CUSTOM, where a response for this particular security event will be made.

The process moves to block 428, where data used as input for the trained model 154a is uploaded for further training the trained model 154a.

The process moves to block 430, where the enterprise computer system 110 updates the KYC profile(s) for the customer of the requisite transaction.

The process then moves to block 432, where it ends. The process may be repeated for as long as desired.

Although the embodiments described herein mainly address security events, such as financial transactions, typically indicative of money laundering, layering, structuring and exit, other financial transactions such as financial crime typologies, as well as security events and situations, such as social engineering, may be validated and acted on in accordance with the disclosed subject matter.

The present disclosed subject matter is directed to a method for validating a security event. The method comprises: downloading an Artificial Intelligence (AI) model, to a local computer associated with an enterprise, the trained AI model having been trained based on: collected features for a security event corresponding to an outcome for the security event, each of the features based on a comparison between a previous at least one data point obtained from information of a previous security event and a corresponding baseline value for the at least one data point obtained from information from one or more of the previous security event, the trained AI model having generated, based on the features of the security event, a set of metrics indicating the risk level of the security event; deploying the trained AI model by the local computer; inputting at least one feature for a given security event into the trained AI model, the at least one feature for the given security event including a data point obtained from information associated with the given security, which is compared against at least one data point value for the baseline of the security event; and, the trained AI model generating and outputting a set of metrics for the given security event.

Optionally, the method is such that the security event comprises a financial transaction occurring in the enterprise or a security situation in the enterprise.

Optionally, the method is such that the enterprise includes a financial institution or a network hosting one or more computers.

Optionally, the method is such that the information associated with the previous security event includes one or more of: answers to questions provided by a platform associated with the enterprise as received from a party to the previous security event as collected information, third party checks of at least certain of the collected information, and, behavior of the party to the security event when providing the information.

Optionally, the method is such that the information associated with the given security event includes one or more of: answers to questions provided by a platform associated with the enterprise as received from a party to the given security event as collected information, third party checks of at least certain of the collected information, and, behavior of the party to the given security event when providing the information.

Optionally, the method is such that the questions provided by the platform include one or more structured questions associated with the given security event, resulting from a trigger being activated as a result of monitoring the security event.

Optionally, the method is such that the data points of the features are compared based on a user versus crowd analysis.

Optionally, the method is such that the least one feature includes a plurality of features, with each feature of the plurality of features including a weight value.

Optionally, the method is such that the AI model is additionally trained based on assigning weight values to each feature of the plurality of features.

Optionally, the method is such that the AI model is additionally trained by changing the weight values for each feature of the plurality of features as a result of one or more of: a new feature being added to the plurality of features, or, the training of the AI model being continuous.

Optionally, the method is such that the set of metrics includes a score relative to the risk level of the security event corresponding to the likelihood that the security event is validated.

Optionally, the method is such that it additionally comprises: the AI model outputting predictions of outcomes of the given security event.

Optionally, the method is such that the comparison of the data points of the feature is based on a distance between the at least one data point from the information and the corresponding baseline data point value.

The present disclosed subject matter is directed to a system for validating a security event. The system comprises: a memory of a local computer associated with an enterprise, the memory configured for storing a trained Artificial Intelligence (AI) model. The AI model has been trained based on: collected features for a security event corresponding to an outcome for the security event, each of the features based on a comparison between a previous at least one data point obtained from information of a previous security event and a corresponding baseline value for the at least one data point obtained from information from one or more of the previous security event; and, the trained AI model having generated, based on the features of the security event, a set of metrics indicating the risk level of the security event. The system also comprises: a processor configured to deploy the trained AI model stored in the memory; obtain and input at least one feature for a given security event into the trained AI model, the at least one feature for the given security event including a data point obtained from information associated with the given security, which is compared against at least one data point value for the baseline of the security event; and, generate an output including a set of metrics for the given security event.

Optionally, the system is such that the processor configured to deploy the trained AI model in the memory additionally comprises: the AI model outputting predictions of outcomes of the given security event.

Optionally, the system is such that the comparison of the data points of the feature is based on a distance between the at least one data point from the information and the value of the corresponding baseline data point.

The present disclosed subject matter is directed to a computer usable non-transitory storage medium having a computer program embodied thereon for causing a suitably programmed system to validate security events in an enterprise computer, by performing the following steps when such program is executed on the system. The steps comprise: downloading an Artificial Intelligence (AI) model, to a local computer associated with an enterprise, the trained AI model having been trained based on: collected features for a security event corresponding to an outcome for the security event, each of the features based on a comparison between a previous at least one data point obtained from information of a previous security event and a corresponding baseline value for the at least one data point obtained from information from one or more of the previous security event, the trained AI model having generated, based on the features of the security event, a set of metrics indicating the risk level of the security event; causing deploying of the trained AI model by the local computer; inputting at least one feature for a given security event into the trained AI model, the at least one feature for the given security event including a data point obtained from information associated with the given security, which is compared against at least one data point value for the baseline of the security event; and, the trained AI model generating and outputting a set of metrics for the given security event.

Optionally, the computer usable non-transitory storage medium is such that it additionally comprises: the AI model outputting predictions of outcomes of the given security event.

Optionally, the computer usable non-transitory storage medium is such that the comparison of the data points of the feature is based on a distance between the at least one data point from the information and the value of the corresponding baseline data point.

The implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system or a cloud-based platform.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system.

In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data.

Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present disclosure. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, cloud-based platforms, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

In the description and claims of the present application, each of the verbs, "comprise," "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A method for validating financial or security events which are determined to be potentially fraudulent comprising:
   generating, by a computer system, an alert that a financial or security event initiated by a user is potentially fraudulent, wherein the user is a customer of a financial institution associated with the computer system, wherein event comprises a financial transaction;
   obtaining, by the computer system, a plurality of data points associated with the alert, wherein the data points comprise data specific to the user and specific to the user's financial account with the financial institution and further comprise a transaction category and an alert category, wherein the transaction comprises a request by the user to initiate or accept a funds transfer;
   based on the output of the first model, prompting the user, by the computer system, via the determined digital communication channel, to provide context for the funds transfer in the form of answers to one or more dynamic interactive questions about the funds transfer, the one or more interactive questions selected using a decision tree that selects a next question based at least in part on an answer received in response to a previous question, wherein the decision tree comprises a second machine learning model trained on the life stories and user profiles of a large population of other users associated with security events and transactions having the same transaction category as that of the alert, wherein the context and user answers are augmented and enriched by the second model based on the training;
   applying, by the computer system, the context and user answers associated with the funds transfer transaction to a third machine learning model comprising a validation model, wherein the third model is trained by conducting a user vs population analysis in which a plurality of event features calculated based on user life stories and profile data, account data, alert data and transactional data are compared, wherein the training uses a cluster module to generate a baseline model for user behavior for determining anomalous behavior, wherein the cluster module uses a distance-based feature analysis as applied to features calculated for a population of prior users associated with events in the same specific transaction category and used as baseline data for the population for the specific transaction category, wherein the baseline data includes user age range and median, transfer amount range and median, and account age range and median, wherein the baseline data is continually recalculated and added to the population baseline model that takes as input a labeled data set comprising data from past alerts that have been cleared as genuine activities, wherein as a result of the user vs population analysis a baseline deviation is calculated for the funds transfer;
   generating, by the computer system using the validation machine learning model, based on the baseline deviation of the funds transfer transaction, a risk score for the funds transfer transaction;
   based on the risk score and one or more other parameters associated with the alert, approving or declining, by the computer system, the funds transfer transaction or initiating, by the computer system, further manual review of the request associated with the funds transfer transaction;
   provisionally adding, by the computer system, the plurality of event features associated with the funds transfer transaction to the population baseline model;
   obtaining, by the computer system, feedback indicating whether the transaction was in fact a fraudulent event; and
   responsive to the feedback indicating that the event was in fact a fraudulent event, removing, by the computer system, the plurality of transaction features from the population baseline model.

2. The method of claim 1, wherein the first model is further trained with data based on previous transactions between other users and the financial institution.

3. The method of claim 1, wherein the data specific to the user and specific to the user's financial account include one or more of: a name of the user, a phone number of the user, an account number of the user, an origin or destination bank account number for a bank transfer initiated by the user, a transfer amount for a bank transfer initiated by the user and a history of alerts that were previously generated in response to transactions initiated by the user.

4. The method of claim 1, wherein the data points further comprise data specific to other users and is obtained from any one or more of the following sources: a profile of the user or a profile of one or more users having a similar profile to that of the user, previous user inquiries for the user, transaction history for the user or transaction history for one or more users having a similar profile to that of the user, and alerts that were previously generated for users having a similar profile to that of the user.

5. The method of claim 1, further comprising:
   updating, by the computer system, a profile of the user based on one or more of the answers.

6. The method of claim 1,
   wherein the risk score is indicative of the likelihood of the alert being generated in response to a fraudulent event, wherein the risk score further includes one or more metrics, and wherein the approving or declining is responsive to applying
   one or more predetermined rules to the one or more metrics.

7. The method of claim 1, wherein the answers are augmented and enriched at least in part using one or more of: third party checks of at least certain ones of the answers, and data obtained in response to an analysis of a behavior of the user when providing one or more of the answers.

8. The method of claim 7, wherein the behavior of the user is determined by performing intent analysis on input provided by the user.

9. The method of claim 2, wherein the first model is further trained to initiate an inquiry in respect of at least some transactions for which no alert was generated.

10. A system for validating financial or security events security events which are determined to be potentially fraudulent comprising:
a processor; and
a memory device on which is stored one or more computer-executable instructions that when executed by the processor cause the processor to perform steps comprising:
generating an alert that a financial or security event initiated by a user is potentially fraudulent, wherein the user is a customer of a financial institution associated with the computer system, wherein event comprises a financial transaction,
obtaining a plurality of data points associated with the alert, wherein the data points comprise data specific to the user and specific to the user's financial account with the financial institution and further comprise a transaction category and an alert category, wherein the transaction comprises a request by the user to initiate or accept a funds transfer,
based on the output of the first model, prompting the user, via the determined digital communication channel, to provide context for the funds transfer in the form of answers to one or more dynamic interactive questions about the funds transfer, the one or more interactive questions selected using a decision tree that selects a next question based at least in part on an answer received in response to a previous question, wherein the decision tree comprises a second machine learning model trained on the life stories and user profiles of a large population of other users associated with security events and transactions having the same transaction category as that of the alert, wherein the context and user answers are augmented and enriched by the second model based on the training,
applying the context and user answers associated with the funds transfer transaction to a third machine learning model comprising a validation model, wherein the third model is trained by conducting a user vs population analysis in which a plurality of event features calculated based on user life stories and profile data, account data, alert data and transactional data are compared, wherein the training uses a cluster module to generate a baseline model for user behavior for determining anomalous behavior, wherein the cluster module uses a distance-based feature analysis as applied to features calculated for a population of prior users associated with events in the same specific transaction category and used as baseline data for the population for the specific transaction category, wherein the baseline data includes user age range and median, transfer amount range and median, and account age range and median, wherein the baseline data is continually recalculated and added to the population baseline model that takes as input a labeled data set comprising data from past alerts that have been cleared as genuine activities, wherein as a result of the user vs population analysis a baseline deviation is calculated for the funds transfer,
generating, using the validation machine learning model, based on the baseline deviation of the funds transfer transaction, a risk score for the funds transfer transaction,
based on the risk score and one or more other parameters associated with the alert, approving or declining the funds transfer transaction or initiating further manual review of the request associated with the funds transfer transaction,
provisionally adding the plurality of event features associated with the funds transfer transaction to the population baseline model,
obtaining feedback indicating whether the transaction was in fact a fraudulent event, and
responsive to the feedback indicating that the event was in fact a fraudulent event, removing the plurality of transaction features from the population baseline model.

11. The system of claim 10, wherein the first model is further trained with data based on previous transactions between other users and the financial institution.

12. The system of claim 10, wherein the data specific to the user and specific to the user's financial account include one or more of: a name of the user, a phone number of the user, an account number of the user, an origin or destination bank account number for a bank transfer initiated by the user, a transfer amount for a bank transfer initiated by the user and a history of alerts that were previously generated in response to transactions initiated by the user.

13. The system of claim 10, wherein the data points further comprise data specific to other users and is obtained from any one or more of the following sources: a profile of the user or a profile of one or more users having a similar profile to that of the user, previous user inquiries for the user, transaction history for the user or transaction history for one or more users having a similar profile to that of the user, and alerts that were previously generated for users having a similar profile to that of the user.

14. The system of claim 10, the steps further comprising:
updating a profile of the user based on one or more of the answers.

15. The system of claim 10,
wherein the risk score is indicative of the likelihood of the alert being generated in response to a fraudulent event, wherein the risk score further includes one or more metrics, and wherein the approving or declining is responsive to applying
one or more predetermined rules to the one or more metrics.

16. The system of claim 10, wherein the answers are augmented and enriched at least in part using one or more of: third party checks of at least certain ones of the answers, and data obtained in response to an analysis of a behavior of the user when providing one or more of the answers.

17. The system of claim 16, wherein the behavior of the user is determined by performing intent analysis on input provided by the user.

18. A non-transitory computer-readable medium on which is stored instructions for a processor to validate financial or security events which are determined to be potentially fraudulent that, when executed by the processor, cause the processor to perform steps of:
generating an alert that a financial or security event initiated by a user is potentially fraudulent, wherein the user is a customer of a financial institution associated with the computer system, wherein event comprises a financial transaction;

obtaining a plurality of data points associated with the alert, wherein the data points comprise data specific to the user and specific to the user's financial account with the financial institution and further comprise a transaction category and an alert category, wherein the transaction comprises a request by the user to initiate or accept a funds transfer;

based on the output of the first model, prompting the user, via the determined digital communication channel, to provide context for the funds transfer in the form of answers to one or more dynamic interactive questions about the funds transfer, the one or more interactive questions selected using a decision tree that selects a next question based at least in part on an answer received in response to a previous question, wherein the decision tree comprises a second machine learning model trained on the life stories and user profiles of a large population of other users associated with security events and transactions having the same transaction category as that of the alert, wherein the context and user answers are augmented and enriched by the second model based on the training;

applying the context and user answers associated with the funds transfer transaction to a third machine learning model comprising a validation model, wherein the third model is trained by conducting a user vs population analysis in which a plurality of event features calculated based on user life stories and profile data, account data, alert data and transactional data are compared, wherein the training uses a cluster module to generate a baseline model for user behavior for determining anomalous behavior, wherein the cluster module uses a distance-based feature analysis as applied to features calculated for a population of prior users associated with events in the same specific transaction category and used as baseline data for the population for the specific transaction category, wherein the baseline data includes user age range and median, transfer amount range and median, and account age range and median, wherein the baseline data is continually recalculated and added to the population baseline model that takes as input a labeled data set comprising data from past alerts that have been cleared as genuine activities, wherein as a result of the user vs population analysis a baseline deviation is calculated for the funds transfer;

generating, using the validation machine learning model, based on the baseline deviation of the funds transfer transaction, a risk score for the funds transfer transaction;

based on the risk score and one or more other parameters associated with the alert, approving or declining the funds transfer transaction or initiating further manual review of the request associated with the funds transfer transaction;

provisionally adding the plurality of event features associated with the funds transfer transaction to the population baseline model;

obtaining feedback indicating whether the transaction was in fact a fraudulent event; and responsive to the feedback indicating that the event was in fact a fraudulent event, removing the plurality of transaction features from the population baseline model.

* * * * *